US010994623B2

United States Patent
King et al.

(10) Patent No.: US 10,994,623 B2
(45) Date of Patent: May 4, 2021

(54) APPARATUS FOR ENERGY TRANSFER USING CONVERTER AND METHOD OF MANUFACTURING SAME

(71) Applicant: General Electric Company, Schenectady, NY (US)

(72) Inventors: Robert Dean King, Schenectady, NY (US); Robert Louis Steigerwald, Burnt Hills, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/787,185

(22) Filed: Feb. 11, 2020

(65) Prior Publication Data

US 2020/0180446 A1 Jun. 11, 2020

Related U.S. Application Data

(63) Continuation of application No. 15/945,168, filed on Apr. 4, 2018, now Pat. No. 10,604,023, which is a (Continued)

(51) Int. Cl.
*B60L 53/00* (2019.01)
*B60L 53/20* (2019.01)
(Continued)

(52) U.S. Cl.
CPC ............... *B60L 53/00* (2019.02); *B60L 50/51* (2019.02); *B60L 53/11* (2019.02); *B60L 53/14* (2019.02);
(Continued)

(58) Field of Classification Search
CPC .......... B60L 53/00; B60L 53/56; B60L 53/20; B60L 50/51; B60L 53/18; B60L 53/16;
(Continued)

(56) References Cited

U.S. PATENT DOCUMENTS 3,904,947 A 9/1975 Crew
4,759,560 A 7/1988 Virgulti
(Continued)

FOREIGN PATENT DOCUMENTS

CA 3056637 A1 4/2010
CA 3005188 A1 6/2020
(Continued)

OTHER PUBLICATIONS

Balogh, L., "The Current-Doubler Rectifier: An Alternative Rectification Technique for Push-Pull and Bridge Converters," Design Note-63, Unitrode Corporation, pp. 1-4 (Dec. 1994).
(Continued)

*Primary Examiner* — M Baye Diao
(74) *Attorney, Agent, or Firm* — Meagher Emanuel Laks Goldberg & Liao, LLP.

(57) ABSTRACT

According to an aspect of the invention, a motor drive circuit includes a first energy storage device configured to supply electrical energy, a bi-directional DC-to-DC voltage converter coupled to the first energy storage device, a voltage inverter coupled to the bi-directional DC-to-DC voltage converter, and an input device configured to receive electrical energy from an external energy source. The motor drive circuit further includes a coupling system coupled to the input device, to the first energy storage device, and to the bi-directional DC-to-DC voltage converter. The coupling system has a first configuration configured to transfer electrical energy to the first energy storage device via the bi-directional DC-to-DC voltage converter, and has a second configuration configured to transfer electrical energy from the first energy storage device to the voltage inverter via the bi-directional DC-to-DC voltage converter.

14 Claims, 9 Drawing Sheets

Related U.S. Application Data continuation of application No. 15/697,948, filed on Sep. 7, 2017, now Pat. No. 9,975,439, which is a continuation of application No. 15/343,493, filed on Nov. 4, 2016, now Pat. No. 9,809,121, which is a continuation of application No. 13/406,241, filed on Feb. 7, 2012, now Pat. No. 10,131,234, which is a continuation of application No. 13/314,572, filed on Dec. 8, 2011, now Pat. No. 9,227,523, which is a continuation of application No. 12/256,466, filed on Oct. 22, 2008, now Pat. No. 8,080,973.

(51) Int. Cl.

| | | |
|---|---|---|
| *B60L 50/51* | (2019.01) | |
| *B60L 53/18* | (2019.01) | |
| *B60L 53/16* | (2019.01) | |
| *B60L 58/20* | (2019.01) | |
| *B60L 53/24* | (2019.01) | |
| *B60L 53/10* | (2019.01) | |
| *B60L 53/14* | (2019.01) | |
| *H02J 3/32* | (2006.01) | |
| *B60L 53/56* | (2019.01) | |
| *H02J 7/00* | (2006.01) | |

(52) U.S. Cl.
CPC .............. *B60L 53/16* (2019.02); *B60L 53/18* (2019.02); *B60L 53/20* (2019.02); *B60L 53/24* (2019.02); *B60L 53/56* (2019.02); *B60L 58/20* (2019.02); *H02J 3/322* (2020.01); *H02J 7/0027* (2013.01); *H02J 7/0045* (2013.01); *B60L 2210/12* (2013.01); *B60L 2210/14* (2013.01); *B60L 2210/20* (2013.01); *B60L 2210/40* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y10S 903/903* (2013.01); *Y10T 29/49117* (2015.01)

(58) Field of Classification Search
CPC .......... B60L 58/20; B60L 53/24; B60L 53/11; B60L 53/14; B60L 2210/40; B60L 2210/12; B60L 2210/14; B60L 2210/20; B60L 53/22; B60L 2240/54; B60L 2240/52; B60L 2210/10; Y10S 903/903; Y10T 29/49117; Y02T 90/14; Y02T 10/92; Y02T 10/70; Y02T 10/72; Y02T 90/12; Y02T 10/7072; H02J 7/342; H02J 7/345; H02J 3/322; H02J 7/0027; H02J 7/0045; H02J 7/0013; H02J 7/0014; H02J 7/0016; H02J 7/0018; H02J 7/0019; H02J 7/0024; H02J 7/0025; H02J 7/0042; H02J 7/0044; H02J 2310/22; H02J 2310/40; H02J 2310/42; H02J 2310/44; H02J 2310/46; H02J 2310/48; H02M 3/155; B60W 10/26; B60W 20/00; B60Y 2200/91; B60Y 2200/92
USPC ........................................................ 320/109
See application file for complete search history.

(56) References Cited

U.S. PATENT DOCUMENTS

| | | |
|---|---|---|
| 4,920,475 A | 4/1990 | Rippel |
| 5,283,513 A | 2/1994 | Fujita et al. |
| 5,308,088 A | 5/1994 | Atkinson et al. |
| 5,373,195 A | 12/1994 | DeDoncker et al. |
| 5,504,414 A | 4/1996 | Kinoshita |
| 5,545,046 A | 8/1996 | Masuda et al. |
| 5,589,743 A | 12/1996 | King |
| 5,594,632 A | 1/1997 | Barrett |
| 5,704,760 A | 1/1998 | Bouchard et al. |
| 5,714,864 A | 2/1998 | Rose et al. |
| 5,734,237 A | 3/1998 | Engel |
| 5,743,584 A | 4/1998 | Lance et al. |
| 5,784,269 A * | 7/1998 | Jacobs ............... H02M 1/4216 363/89 |
| 5,803,215 A | 9/1998 | Henze et al. |
| 5,903,449 A | 5/1999 | Gerrigan et al. |
| 5,926,004 A | 7/1999 | Henze |
| 5,929,594 A | 7/1999 | Nonobe |
| 5,929,595 A | 7/1999 | Lyons et al. |
| 5,952,813 A | 9/1999 | Ochiai |
| 5,961,279 A | 10/1999 | Ingistov |
| 6,046,915 A * | 4/2000 | Jacobs ................. H02M 3/158 363/39 |
| 6,077,038 A | 6/2000 | Gail et al. |
| 6,079,945 A | 6/2000 | Wolfe et al. |
| 6,105,967 A | 8/2000 | Turnquist et al. |
| 6,109,229 A | 8/2000 | Pels |
| 6,131,910 A | 10/2000 | Bagepalli et al. |
| 6,131,911 A | 10/2000 | Cromer et al. |
| 6,160,374 A | 12/2000 | Hayes et al. |
| 6,226,975 B1 | 5/2001 | Ingistov |
| 6,250,641 B1 | 6/2001 | Dinc et al. |
| 6,251,494 B1 | 6/2001 | Schreiber |
| 6,257,586 B1 | 7/2001 | Skinner et al. |
| 6,261,057 B1 | 7/2001 | Turnquist et al. |
| 6,331,006 B1 | 12/2001 | Baily et al. |
| 6,331,365 B1 | 12/2001 | King |
| 6,335,871 B1 | 1/2002 | Kita et al. |
| 6,344,985 B1 | 2/2002 | Akerson |
| 6,402,157 B1 | 6/2002 | Zhou et al. |
| 6,471,213 B1 | 10/2002 | Yuri et al. |
| 6,499,742 B1 | 12/2002 | Zhou et al. |
| 6,505,834 B1 | 1/2003 | Dinc et al. |
| 6,550,777 B2 | 4/2003 | Turnquist et al. |
| 6,583,519 B2 | 6/2003 | Aberle et al. |
| 6,608,396 B2 | 8/2003 | Downer |
| 6,615,118 B2 | 9/2003 | Kumar |
| 6,630,810 B2 | 10/2003 | Takemasa |
| 6,644,668 B1 | 11/2003 | Albers et al. |
| 6,655,696 B1 | 12/2003 | Fang et al. |
| 6,724,100 B1 | 4/2004 | Gabriel |
| 6,737,822 B2 | 5/2004 | King |
| 6,777,909 B1 | 8/2004 | Aberle et al. |
| 6,779,799 B2 | 8/2004 | Tong et al. |
| 6,781,351 B2 | 8/2004 | Mednik et al. |
| 6,786,487 B2 | 9/2004 | Dinc et al. |
| 6,790,001 B2 | 9/2004 | Turnquist et al. |
| 6,827,350 B2 | 12/2004 | Walcott et al. |
| 6,840,519 B2 | 1/2005 | Dinc et al. |
| 6,854,735 B2 | 2/2005 | Sarshar et al. |
| 6,909,200 B2 | 6/2005 | Bouchon |
| 6,917,180 B2 | 7/2005 | Harrison et al. |
| 6,951,339 B2 | 10/2005 | Turnquist et al. |
| 7,049,792 B2 | 5/2006 | King |
| 7,109,686 B2 | 9/2006 | Schulte et al. |
| 7,124,691 B2 | 10/2006 | Donnelly et al. |
| 7,168,708 B2 | 1/2007 | Dalton et al. |
| 7,327,113 B2 | 2/2008 | Steigerwald et al. |
| 7,352,154 B2 | 4/2008 | Cook |
| 7,407,025 B2 | 8/2008 | Urakabe et al. |
| 7,411,316 B2 | 8/2008 | Pai |
| 7,427,450 B2 | 9/2008 | Raiser |
| 7,489,093 B2 | 2/2009 | King et al. |
| 7,517,298 B2 | 4/2009 | Ortmann |
| 7,559,388 B2 | 7/2009 | Severinsky et al. |
| 7,578,509 B2 | 8/2009 | Grondahl |
| 7,583,050 B2 | 9/2009 | Suguira et al. |
| 7,595,597 B2 | 9/2009 | King et al. |
| 7,604,241 B2 | 10/2009 | Kowalczyk |
| 7,866,425 B2 | 1/2011 | King et al. |
| 7,932,633 B2 | 4/2011 | King et al. |
| 7,952,236 B2 | 5/2011 | Mitsutani |
| 8,030,882 B2 | 10/2011 | Ito et al. |
| 8,039,987 B2 | 10/2011 | Sawada |

(56) References Cited

U.S. PATENT DOCUMENTS

| | | |
|---|---|---|
| 8,080,973 B2 | 12/2011 | King et al. |
| 8,154,149 B2 | 4/2012 | King |
| 8,167,313 B2 | 5/2012 | Burdgick et al. |
| 8,183,820 B2 | 5/2012 | Anwar et al. |
| 8,188,710 B2 | 5/2012 | Ichikawa et al. |
| 8,274,239 B2 | 9/2012 | Felty |
| 8,461,814 B2 | 6/2013 | Peron |
| 8,467,199 B2 | 6/2013 | Lee et al. |
| 9,290,097 B2 | 3/2016 | Steigerwald et al. |
| 9,809,121 B2 | 11/2017 | King |
| 9,975,439 B2 | 5/2018 | King et al. |
| 2002/0109406 A1 | 8/2002 | Aberle |
| 2003/0067278 A1 | 4/2003 | Nakamura et al. |
| 2003/0107352 A1 | 6/2003 | Downer et al. |
| 2004/0062059 A1 | 4/2004 | Cheng |
| 2005/0057895 A1 | 3/2005 | Chen et al. |
| 2005/0073106 A1 | 4/2005 | Thermos et al. |
| 2005/0151513 A1 | 7/2005 | Cook et al. |
| 2005/0151517 A1 | 7/2005 | Cook et al. |
| 2006/0113798 A1 | 6/2006 | Oyobe et al. |
| 2006/0152085 A1 | 7/2006 | Flett et al. |
| 2007/0029881 A1 | 2/2007 | Lai |
| 2007/0086222 A1 | 4/2007 | Iida |
| 2007/0132189 A1 | 6/2007 | Short et al. |
| 2007/0139975 A1 | 6/2007 | Yamauchi et al. |
| 2007/0169970 A1 | 7/2007 | Kydd |
| 2007/0289794 A1 | 12/2007 | Ishikawa et al. |
| 2008/0053716 A1 | 3/2008 | Scheucher |
| 2008/0057316 A1 | 3/2008 | Scheucher |
| 2008/0086710 A1 | 4/2008 | Huynh et al. |
| 2008/0094013 A1 | 4/2008 | Su |
| 2008/0142282 A1 | 6/2008 | Bartilson |
| 2008/0203966 A1 | 6/2008 | Ward |
| 2008/0065990 A1 | 7/2008 | Harrison |
| 2008/0174966 A1 | 7/2008 | Badger et al. |
| 2008/0203973 A1 | 8/2008 | Gale et al. |
| 2008/0205109 A1 | 8/2008 | Darroman et al. |
| 2008/0215200 A1 | 9/2008 | Toth |
| 2008/0291707 A1 | 11/2008 | Fang |
| 2009/0032203 A1 | 2/2009 | Liang |
| 2009/0096410 A1 | 4/2009 | Sakurai |
| 2009/0103341 A1* | 4/2009 | Lee ........................ B60L 53/24 363/124 |
| 2009/0121659 A1 | 5/2009 | Oyobe et al. |
| 2009/0171523 A1 | 7/2009 | Luo et al. |
| 2009/0309534 A1 | 12/2009 | Harris |
| 2009/0309537 A1 | 12/2009 | Saito |
| 2010/0006356 A1 | 1/2010 | Curry et al. |
| 2010/0019723 A1 | 1/2010 | Ichikawa |
| 2010/0019734 A1 | 1/2010 | Oyobe et al. |
| 2010/0063675 A1 | 3/2010 | Soma et al. |
| 2010/0078993 A1 | 4/2010 | Ichikawa |
| 2010/0127665 A1 | 5/2010 | Mitsutani |
| 2011/0115288 A1 | 5/2011 | Lee |
| 2011/0316481 A1 | 12/2011 | Bouchez et al. |
| 2012/0007552 A1 | 1/2012 | Song et al. |
| 2012/0013308 A1 | 1/2012 | Briane et al. |
| 2012/0313562 A1 | 12/2012 | Murao et al. |
| 2014/0049215 A1 | 2/2014 | Fassnacht |

FOREIGN PATENT DOCUMENTS

| | | |
|---|---|---|
| CN | 1495340 A | 5/2004 |
| CN | 1750375 A | 3/2006 |
| CN | 1815870 A | 8/2006 |
| CN | 1886282 A | 12/2006 |
| CN | 1886828 A | 12/2006 |
| CN | 1976827 A | 6/2007 |
| CN | 101003259 A | 7/2007 |
| CN | 101254757 A | 9/2008 |
| CN | 101375020 A | 2/2009 |
| DE | 40 13 506 A1 | 10/1991 |
| EP | 0 493 848 A2 | 7/1992 |
| EP | 1 201 485 A1 | 5/2002 |
| EP | 1 697 158 A1 | 9/2006 |
| EP | 2068431 A1 | 6/2009 |
| EP | 2179882 A2 | 4/2010 |
| JP | 05207664 A | 8/1993 |
| JP | H05-207664 A | 8/1993 |
| JP | 07322524 A | 12/1995 |
| JP | H07-322524 A | 12/1995 |
| JP | 08107683 A | 4/1996 |
| JP | H08-107683 A | 4/1996 |
| JP | 08126122 A | 5/1996 |
| JP | H8-126122 A | 5/1996 |
| JP | H099417 A | 1/1997 |
| JP | H10206526 A | 8/1998 |
| JP | 2002-209378 A | 7/2002 |
| JP | 2002-354844 A | 12/2002 |
| JP | 2003-116280 A | 4/2003 |
| JP | 2005-051871 A | 2/2005 |
| JP | 2006-191766 A | 7/2006 |
| JP | 2006-340466 A | 12/2006 |
| JP | 2006345606 A | 12/2006 |
| JP | 2007274785 | 10/2007 |
| JP | 4089909 B2 | 5/2008 |
| JP | 2008-167616 A | 7/2008 |
| JP | 2009106054 A | 5/2009 |
| JP | 2009-148073 A | 7/2009 |
| JP | 2009148073 A | 7/2009 |
| JP | 2010-104227 A | 5/2010 |
| JP | 2010-124536 A | 6/2010 |
| JP | 200927812 A | 8/2010 |
| KR | 10-2005-0057895 A | 6/2005 |
| KR | 10-2008-0065990 A | 7/2008 |
| WO | 79/01127 A1 | 12/1979 |
| WO | 2006132052 A2 | 12/2006 |
| WO | 2008041418 A1 | 4/2008 |

OTHER PUBLICATIONS

Lee, S. J., and Sul, S. K., "An Integral Battery Charger for 4 Wheel Drive Electric Vehicle," Conference Record of the 1994 IEEE Industry Applications Society Annual Meeting, pp. 448-452 (Oct. 2-6, 1994).

Mappus, S., "Current Doubler Rectifier Offers Ripple Current Cancellation," Application Note, SLUA323, Texas Instruments, pp. 1-8 (Sep. 2004) [Abstract].

Schutten, M. J., et al., "Characteristics of Load Resonant Converters Operated in a High-Power Factor Mode," IEEE Transactions on Power Electronics, vol. 7, Issue 2, pp. 304-314 (Apr. 1992).

Solero, L., "Nonconventional On-Board Charger for Electric Vehicle Propulsion Batteries," IEEE Transactions on Vehicular Technology, vol. 50, Issue 1, pp. 144-149 (Jan. 2001).

Sul, S. K., and Lee, S. J., "An Integral Battery Charger for Four-Wheel Drive Electric Vehicle," IEEE Transactions on Industry Applications, vol. 31, Issue 5, pp. 1096-1099 (Sep./Oct. 1995).

Sulistyono, W. and Enjeti, P., "A series resonant AC-to-DC rectifier with high-frequency isolation," IEEE Transactions on Power Electronics, vol. 10, Issue 6, pp. 784-790 (Jan. 1, 1995).

Sulistyono, W. and Enjeti, P., "A series resonant AC-to-DC rectifier with high-frequency isolation," Ninth Annual Conference Proceedings of Applied Power Electronics Conference and Exposition, pp. 397-403 (Feb. 13-17, 1994).

Non-Final Rejection issued in connection with related U.S. Appl. No. 12/256,457 dated Jul. 23, 2010.

Non-Final Rejection issued in connection with related U.S. Appl. No. 13/072,085 dated Jun. 22, 2012.

Final Rejection issued in connection with related U.S. Appl. No. 13/072,085 dated Jan. 17, 2013.

First Office Action and Search issued in connection with corresponding CN Application No. 200910209818.3 dated Mar. 21, 2013.

Non-Final Rejection towards corresponding U.S. Appl. No. 13/406,208 dated Apr. 25, 2013.

Non-Final Rejection issued in connection with related U.S Appl. No. 12/940,110 dated Sep. 13, 2013.

Notification of Reasons for Refusal issued in connection with related JP Application No. 2009240959 dated Jan. 8, 2014.

(56) References Cited

OTHER PUBLICATIONS

Final Rejection issued in connection with related U.S. Appl. No. 12/940,110 dated Apr. 28, 2014.
First Office Action issued in connection with related CN Application No. 201110379597.1 dated Aug. 21, 2014.
Second Office Action issued in connection with related CN Application No. 201110379597.1 dated Apr. 3, 2015.
First Office Action and Search issued in connection with related CN Application No. 201310010307 dated Apr. 22, 2015.
Notice of Allowance issued in connection with related U.S. Appl. No. 12/940,110 dated Jul. 9, 2015.
Decision to Grant issued in connection with related JP Application No. 2009-240959 dated Aug. 25, 2015.
Third Office Action issued in connection with related CN Application No. 201110379597.1 dated Aug. 28, 2015.
Office Action issued in connection with related KR Application No. 1020090100614 dated Nov. 1, 2015.
Notification of Reasons for Refusal issued in connection with related JP Application No. 2011238096 dated Nov. 4, 2015.
Notice of Allowance issued in connection with related U.S. Appl. No. 12/940,110 dated Nov. 20, 2015.
Office Action issued in connection with corresponding CA Application No. 2682843 dated Dec. 11, 2015.
Second Office Action issued in connection with related CN Application No. 201310010307.5 dated Dec. 28, 2015.
Notice of Allowance issued in connection with related KR Application No. 1020090100614 dated May 24, 2016.
Notice of Allowance issued in connection with corresponding KR Application No. 1020090100663 dated Jun. 1, 2016.
Notification of Reasons for Refusal issued in connection with related JP Application No. 2011238096 dated Jun. 7, 2016.
Non-Final Rejection issued in connection with related U.S. Appl. No. 15/073,061 dated Jul. 11, 2016.
Notice of Allowance issued in connection with related U.S. Appl. No. 14/169,338 dated Sep. 14, 2016.
Office Action issued in connection with related KR Application No. 1020160107526 dated Sep. 22, 2016.
Final Rejection issued in connection with related U.S. Appl. No. 15/073,061 dated Nov. 18, 2016.
Notice of Allowance issued in connection with related U.S. Appl. No. 14/169,338 dated Jan. 19, 2017.
Decision to Grant issued in connection with related JP Application No. 2011238096 dated Jan. 24, 2017.
Notice of Allowance issued in connection with corresponding KR Application No. 1020160112685 dated Feb. 1, 2017.
Non-Final Rejection towards corresponding U.S. Appl. No. 15/343,493 dated Feb. 24, 2017.
Office Action issued in connection with related KR Application No. 1020160107526 dated Mar. 14, 2017.
Non-Final Rejection issued in connection with related U.S. Appl. No. 15/073,061 dated Apr. 10, 2017.
Notice of Allowance towards corresponding U.S. Appl. No. 15/343,493 dated Jun. 14, 2017.
Extended European Search Report issued in connection with related EP Application No. 11187389.9 dated Jun. 27, 2017.
Non-Final Rejection towards U.S. Appl. No. 15/697,948 dated Oct. 30, 2017.
Extended European Search Report and Opinion issued in connection with corresponding EP Application No. 09173009.3 dated Nov. 13, 2017.
Widodo Sulistyono et al: "A Series Resonant AC-to-DC Rectifier With High-Frequency Isolation", Proceedings of the Annual Applied Power Electronics Conference and Exposition (APEC). Orlando, Feb. 13-17, 1994; [Proceedings of the Annual Applied Power Electronics Cnference and Exposition (APEC)], New York, IEEE, vol. 1, Feb. 13, 1994 ) Feb. 13, 1994), pp. 197-403.
Sulistyono W et al: "A Series Resonant AC-to-PC Rectifier With High-Frequency Isolation", IEEE Transactions on Power Electronics, Institute of Electrical and Electronics Engineers, USA, vol. 10, No. 6, Jan. 1, 1995 (Jan. 1, 1995), pp. 784-790.
Unofficial English Translation of Notice of Allowance issued in connection with corresponding KR Application No. 10-2009-0100663 dated Feb. 1, 2017.
CN200910209818.3 (Chinese Application corresponding to U.S. Appl. No. 14/597,852—Search Report.
Office Action issued in connection with related CA 3,056,637 dated Nov. 13, 2020.
Severns et al., "Modern DC-to-DC Power Converter Circuits", Van Nostrand Reinhold Electric/Computer Science and Engineering Series, Chapter 7, pp. 153-174, 1985.

* cited by examiner

APPARATUS FOR ENERGY TRANSFER USING CONVERTER AND METHOD OF MANUFACTURING SAME

CROSS-REFERENCE TO RELATED APPLICATION

The present application is a continuation of and claims priority to Ser. No. 15/945,168 filed Apr. 4, 2018 which is a continuation and claims priority to U.S. patent application Ser. No. 15/697,948 filed Sep. 7, 2017 and issues as U.S. Pat. No. 9,975,439, which is a continuation and claims priority to U.S. patent application Ser. No. 15/343,493 filed Nov. 4, 2016 and issues as U.S. Pat. No. 9,809,121, which is a continuation of and claims priority to U.S. patent application Ser. No. 13/406,241 filed Feb. 27, 2012 issues as U.S. Pat. No. 10,131,234, which is a continuation of and claims priority to U.S. patent application Ser. No. 13/314,572 filed Dec. 8, 2011 and issues as U.S. Pat. No. 9,227,523, which is a continuation of and claims priority to U.S. patent application Ser. No. 12/256,466 filed Oct. 22, 2008 and issues as U.S. Pat. No. 8,080,973, the disclosures of which are incorporated herein.

BACKGROUND OF THE INVENTION

The invention relates generally to hybrid and electric vehicles, and more specifically to systems for charging the energy storage devices used for powering hybrid and electric vehicles.

Hybrid electric vehicles combine an internal combustion engine and an electric motor that is typically powered by an energy storage device, such as a traction battery. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles typically use stored electrical energy to power an electric motor, which propels the vehicle. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Plug-in hybrid electric vehicles are configured to use electrical energy from an external source to recharge the traction battery. This saves fuel by reducing the amount of time the internal combustion engine must operate to recharge the traction battery. Such vehicles, which may include on-road and off-road vehicles, golf carts, forklifts and utility trucks may use either off-board stationary battery chargers or on-board battery chargers to transfer electrical energy from an external energy source, such as the utility grid, to the vehicle's on-board traction battery. Plug-in hybrid passenger vehicles typically include circuitry and connections to facilitate the recharging of the traction battery from an external energy source, such as the utility grid, for example. Typically, the battery charging circuitry includes boost converters, high-frequency filters, choppers, inductors and other electrical components. These additional components which are not generally used during vehicle operation add cost and weight to the vehicle.

It would therefore be desirable to provide an apparatus to facilitate the transfer of electrical energy from an external source to the on-board electrical storage device of a plug-in vehicle that reduces the number of components dedicated only to transferring energy between the on-board electrical storage device and the external source.

BRIEF DESCRIPTION OF THE INVENTION

According to an aspect of the invention, a motor drive circuit includes a first energy storage device configured to supply electrical energy, a bi-directional DC-to-DC voltage converter coupled to the first energy storage device, a voltage inverter coupled to the bi-directional DC-to-DC voltage converter, and an input device configured to receive electrical energy from an external energy source. The motor drive circuit further includes a coupling system coupled to the input device, to the first energy storage device, and to the bi-directional DC-to-DC voltage converter. The coupling system has a first configuration configured to transfer electrical energy to the first energy storage device via the bi-directional DC-to-DC voltage converter, and has a second configuration configured to transfer electrical energy from the first energy storage device to the voltage inverter via the bi-directional DC-to-DC voltage converter.

In accordance with another aspect of the invention, a method of manufacturing that includes providing a first energy storage device, coupling a first bi-directional buck/boost converter to the first energy storage device, and coupling an input device to the first bi-directional buck/boost converter. The input device is configured to receive electrical energy from an external energy source. The method further includes coupling one or more coupling devices to the first bi-directional buck/boost converter, to the first energy storage device, and to the input device, the one or more coupling devices configured to cause electrical energy to charge the first energy storage device via the first bi-directional buck/boost converter, and configured to cause electrical energy from the first energy storage device to transfer to the voltage inverter via the first bi-directional buck/boost converter.

According to yet another aspect of the invention, a traction system includes an electric motor configured to propel a vehicle and a voltage inverter configured to supply an AC power signal to the electric motor. The system also includes a motor drive circuit configured to supply a DC power signal to the voltage inverter. The motor drive circuit has a first battery and a first bi-directional buck/boost converter coupled to the first battery, the first bi-directional buck/boost converter having a first inductor and a first transistor. The motor drive circuit also has an input device configured to receive electrical energy from an external energy source and has a coupling system having a first configuration in which the external energy source is coupled to the first battery via the input device and the first bi-directional buck/boost converter. The coupling system also has a second configuration in which the first battery is coupled to the voltage inverter via the first bi-directional buck/boost converter.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
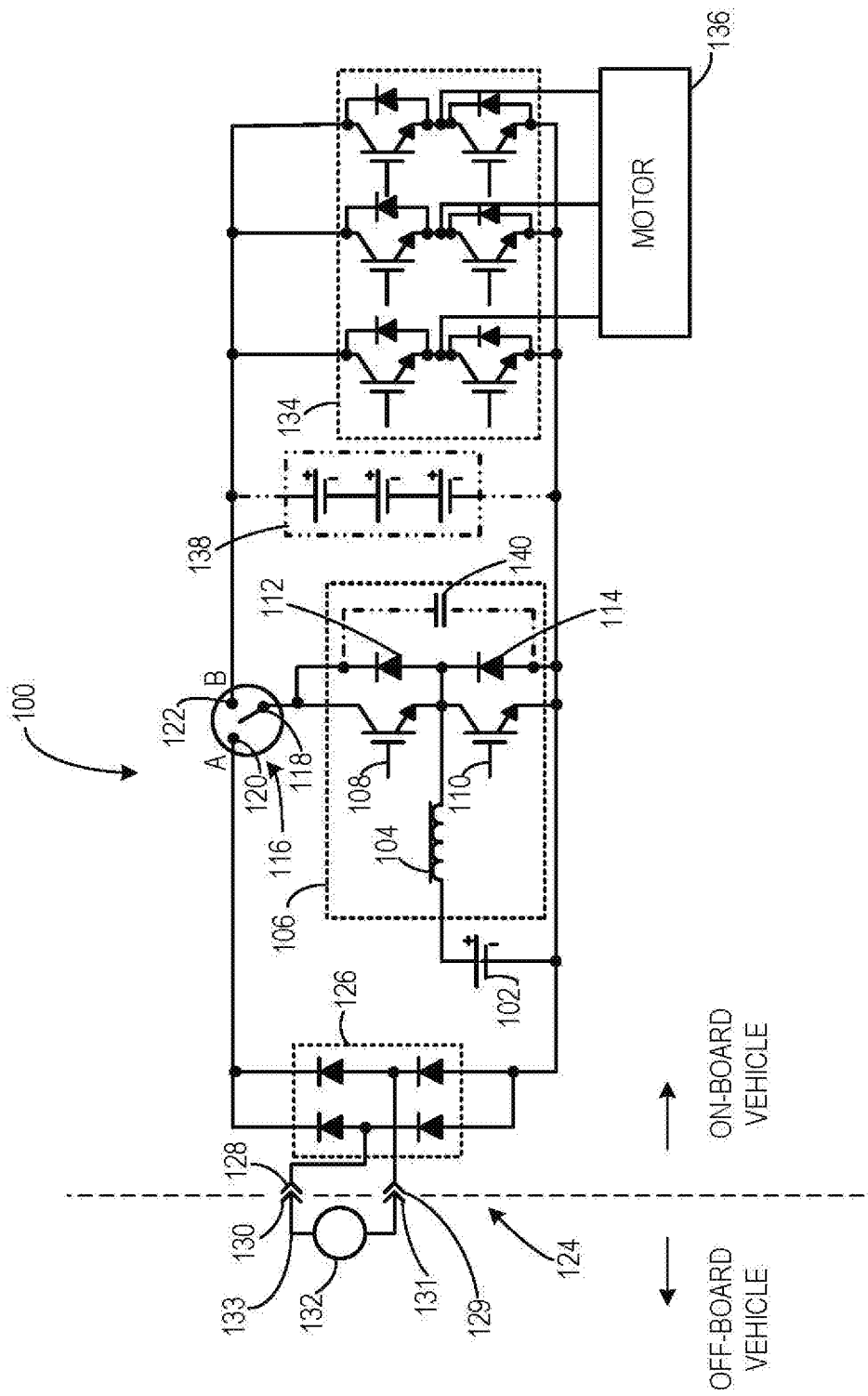
FIG. 1 is a schematic diagram illustrating a traction system according to an embodiment of the invention.

In an embodiment of the invention illustrated in FIG. 1, a traction system 100 usable in a vehicle, such as a plug-in electric or plug-in hybrid vehicle, or stationary electric drive system is shown. Traction system 100 includes a first energy storage device 102, which may be a battery, a fuel cell, an ultracapacitor, or the like, coupled to an inductor 104 of a bi-directional DC-to-DC voltage converter 106. Inductor 104 is coupled to a first transistor 108 and a second transistor 110 connected in series. Each of the transistors 108, 110 is coupled in anti-parallel with a first and second diode 112, 114, respectively. A coupling system 116 includes a switch 118, which may be, for example, a contactor, a relay, a semiconductor switch, or the like. Switch 118 has a first position 120 and a second position 122 and is coupled to first transistor 108. When switch 118 is in first position 120, bi-directional DC-to-DC voltage converter 106 is coupled to an input device 124, which includes a diode rectifier 126 and a receptacle 128, 129 configured to connect to an electrical plug 130, 131 of an external energy source 132 for transfer of DC or AC electrical energy. In an embodiment of the invention, an electrical cord 133 incorporating plug 130, 131 may be coupled to an outlet (not shown) coupled to external energy source 132 to electrically connect external energy source 132 to input device 124 for transfer of DC or AC electrical energy. External energy source 132 may be, for example, a utility grid. When switch 118 is in second position 122, bi-directional DC-to-DC voltage converter 106 is coupled to a three-phase DC-to-AC voltage inverter 134, which inverts DC power into AC power for driving an electric motor 136. Embodiments of the invention are not limited to three-phase voltage inverters and may include voltage inverters with a greater or lesser number of phases.

In an embodiment of the invention, a second energy storage device 138 (shown in phantom), which may be a battery, a fuel cell, an ultracapacitor, or the like, is coupled to voltage inverter 134. Bi-directional DC-to-DC voltage converter 106 may be a bi-directional buck/boost converter. As such, bi-directional buck/boost converter 106 may include a capacitor 140 (shown in phantom) coupled across the two transistors 108, 110. When charging energy storage devices 102, 138 using voltage from an external energy source 132, bi-directional DC-to-DC voltage converter 106 permits modulation or buck conversion of the voltage to control the energy transfer between external energy source 132 and energy storage devices 102, 138. An increase in the power factor compared to conventional battery chargers results in a more efficient transfer of energy to the storage devices 102, 138.

The power factor of an AC electric power system is defined as the ratio of the real power to the apparent power and may be expressed as a number between 0 and 1 or as a percentage between 0 and 100. Real power is the capacity of the circuit for performing work in a particular time. Apparent power is the product of the current and voltage of the circuit. Due to energy stored in the load and returned to the source, or due to a non-linear load that distorts the wave shape of the current drawn from the source, the apparent power can be greater than the real power. A circuit with a lower power factor performs less work than a circuit with a higher power factor. Therefore, to perform the same amount of work, a higher voltage or current is input into the circuit with the lower power factor.

In circuits having sinusoidal currents and voltages, the power factor may be decreased due to differences in phase between the current and voltage. Switch-mode power supplies may be configured to control the amount of power drawn by a load to increase the energy transfer power factor. In some applications, a switch-mode power supply, such as one including a buck/boost converter for example, controls the current output therefrom so that the current waveform is proportional to the voltage waveform output therefrom. For example, the buck/boost converter may shape the current waveform into a sine wave that is in phase with a sine wave of the voltage waveform. The boost converter can be controlled to maintain a constant DC bus output line voltage while drawing a current that is in phase with, and at the same frequency as, the output line voltage.

In operation, switch 118 is placed in second position 122 during normal vehicle operation (i.e., motoring). First energy storage device 102 supplies a DC voltage to bi-directional DC-to-DC voltage converter 106, which steps up, or boosts, the DC voltage. The boosted DC voltage is converted into an AC voltage by voltage inverter 134 to drive electric motor 136. Likewise, during normal vehicle operation (i.e. deceleration or while braking, often referred to as regenerative braking), electric drive motor 136 acts as an electrical generator and an AC voltage is converted to a DC voltage in the voltage inverter 134 and supplies a DC voltage to bi-directional DC-to-DC voltage converter 106, which steps down, or bucks, the DC voltage and supplies the DC voltage to partially recharge the first energy storage device 102.

Switch 118 is placed in first position 120 during recharging of first energy storage device 102 from the external source 132. Plug 130, 131 transfers power from external energy source 132, such as the utility grid, through receptacle 128, 129 to diode rectifier 126. In an embodiment of the invention, diode rectifier 126 converts an AC voltage into a DC voltage, which generates an electric current that charges first energy storage device 102 through first transistor 108, second diode 114, and inductor 104. By toggling switch 118 to second position 122, first energy storage device 102 supplies a DC voltage to bi-directional DC-to-DC voltage converter 106, which boosts the DC voltage and supplies the boosted DC voltage to charge second energy storage device 138 through switch 118.

Figure 2:
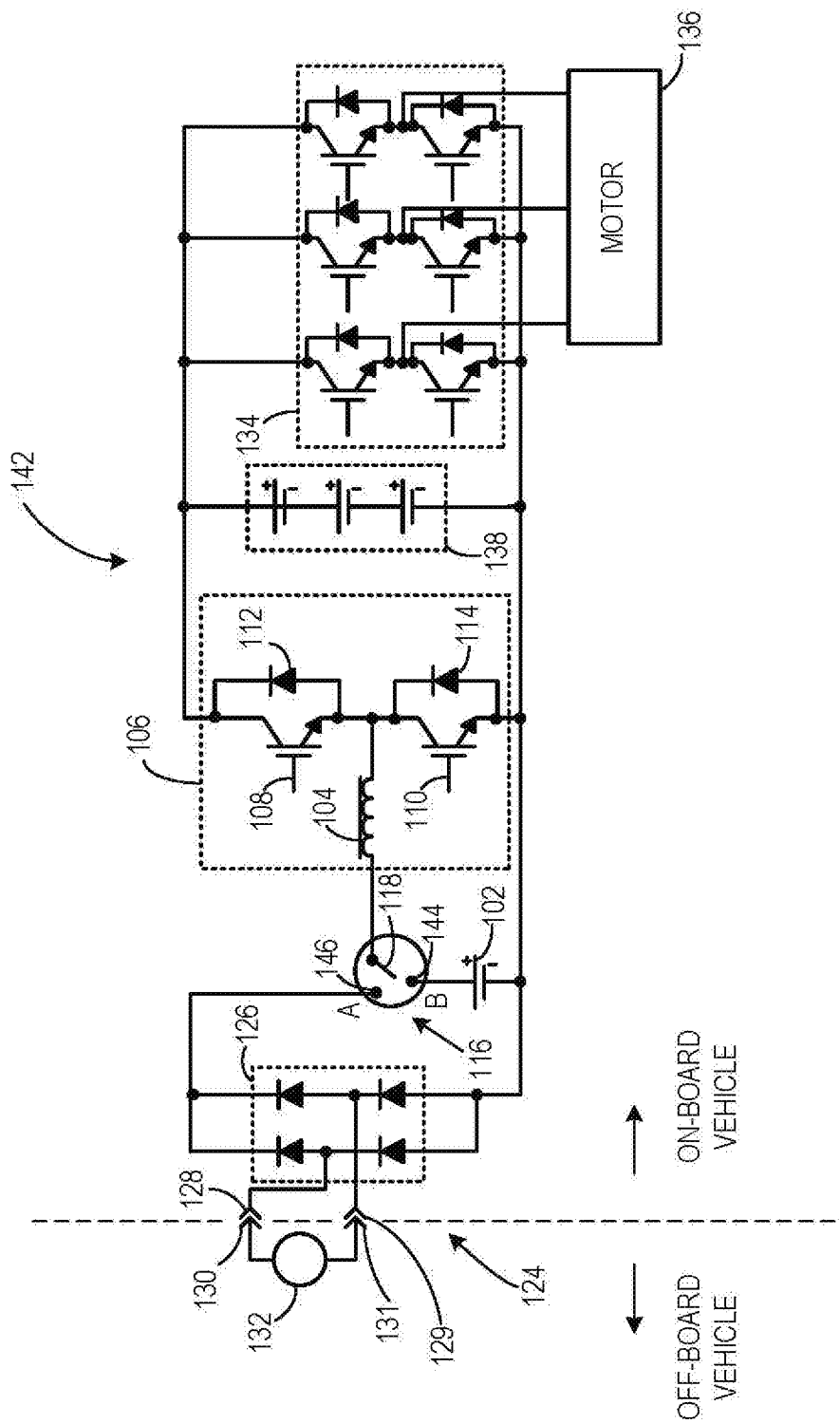
FIG. 2 is a schematic diagram illustrating a traction system according to another embodiment of the invention.

An embodiment of the invention illustrated in FIG. 2 shows a traction system 142 usable in a vehicle, such as a plug-in electric or plug-in hybrid vehicle, or stationary electric drive system. Elements and components common to traction systems 100 and 142 will be discussed relative to the same reference numbers as appropriate. FIGS. 3-8 will also discuss common components relative to the same reference numbers. Switch 118, rather than being directly coupled to first transistor 108 as shown in FIG. 1, is directly coupled to inductor 104 of bi-directional DC-to-DC voltage converter 106. In a first position 144, switch 118 couples bi-directional DC-to-DC converter 106 to first energy storage device 102. In a second position 146, switch 118 couples bi-directional converter 106 to input device 124.

In operation, switch 118 is placed in first position 144 during normal vehicle operation (i.e., motoring or regenerative braking). As in the embodiment described with respect to FIG. 1, during motoring, first energy storage device 102 supplies a DC voltage to bi-directional DC-to-DC voltage converter 106, which steps up, or boosts, the DC voltage that is then output to second energy storage device 136 and converted into an AC voltage by voltage inverter 134 to drive the electric motor 136. Similar to FIG. 1, during regenerative braking, motor 136 acts as a generator and electrical energy and power are transferred through inverter 134, to partially recharge second energy storage device 138, if present, plus transfer of electrical energy and power through bi-directional DC-DC converter 106, (acting in buck mode) to partially recharge first energy storage device 102.

Placing switch 118 in second position 146 couples inductor 104 to input device 124. Diode rectifier 126 provides a DC charging signal to bi-directional DC-to-DC voltage converter 106, which outputs a boosted charging DC signal to charge second energy storage device 138. By toggling switch 118 to first position 144, electrical energy can be transferred from second energy storage device 138 through first transistor 108, diode 114 and inductor 104 to charge first energy storage device 102.

Figure 3:
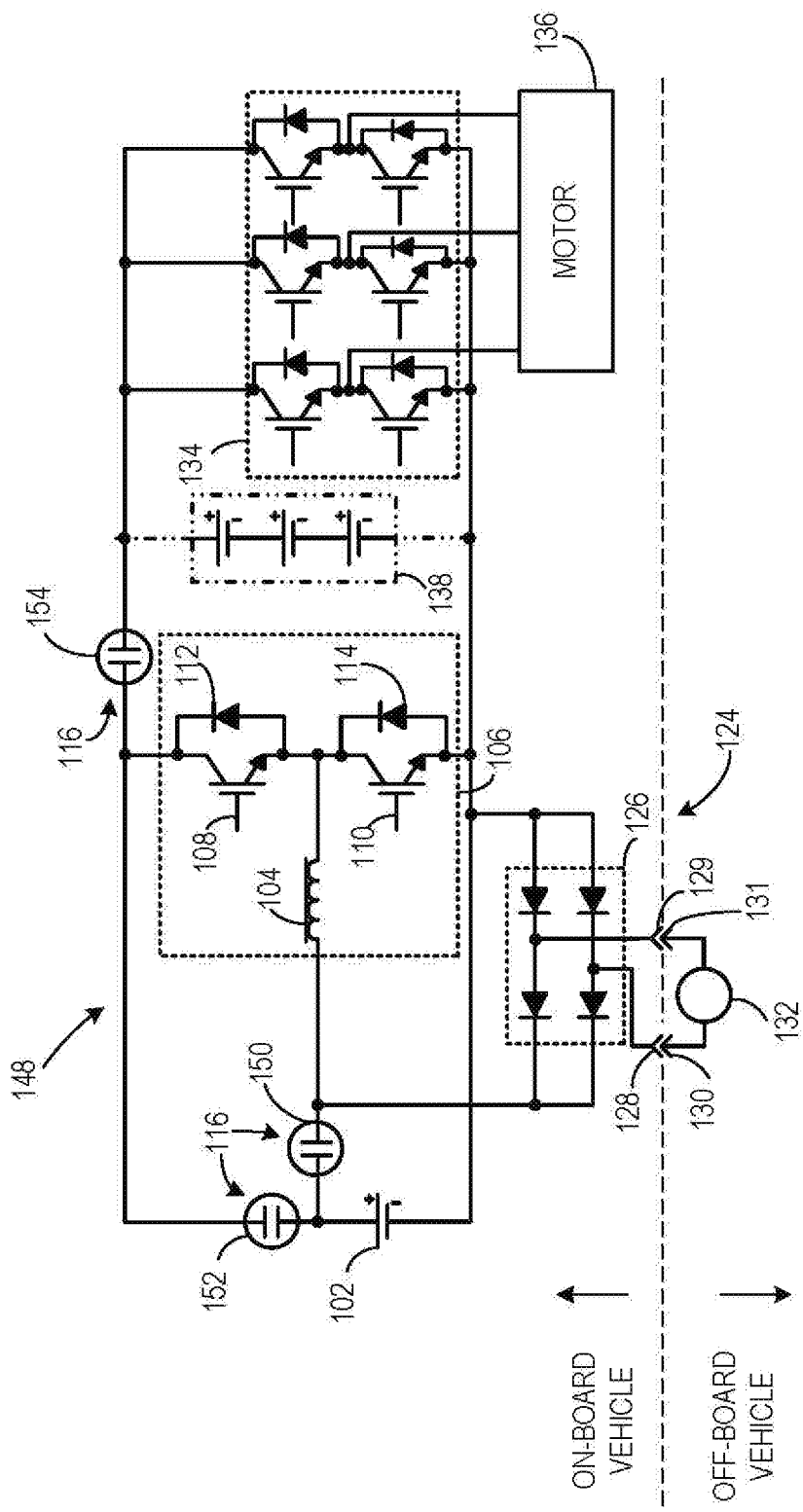
FIG. 3 is a schematic diagram illustrating a traction system according to another embodiment of the invention.

An embodiment of the invention illustrated in FIG. 3 includes a traction system 148 usable in a vehicle, such as a plug-in electric or plug-in hybrid vehicle, or other stationary electric drive system. In this embodiment, coupling system 116 includes a first, second, and third contactor 150, 152, and 154, respectively. First energy storage device 102 is directly coupleable to inductor 104 through first contactor 150 and directly coupleable to first transistor 108 through a second contactor 152. First transistor 108 is directly coupleable to second energy storage device 138 through a third contactor 154.

In operation, first energy storage device 102 is charged when second contactor 152 is closed and the other two contactors 150, 154 are open. Electrical energy from external energy source 132 flows through inductor 104, first contactor 152, and the bidirectional converter 106, which acts as a boost converter to charge first energy storage device 102. When in this boost mode, transistor 110 switches at a high frequency and inverse diode 112 acts as a "freewheeling" diode. Second energy storage device 138, if present, is charged when third contactor 154 is closed and the other two contactors 150, 152 are open. In one example, electrical energy from the utility grid, converted to a DC signal by diode rectifier 126, flows through inductor 104, third contactor 154 and the bidirectional DC-to-DC voltage converter 106 acts as a boost converter to charge second energy storage device 138. It is contemplated that first and second energy storage devices 102, 138 may be simultaneously charged by closing second and third contactors 152, 154 and opening second contactor 150.

When the vehicle is in motoring mode, contactors 150 and 154 are closed and the other contactor 152, is open. During motoring, first energy storage device 102 supplies a DC voltage through the contactor 150 to bi-directional DC-to-DC voltage converter 106 which boosts the DC signal. The DC power signal from converter 106 flows through the third contactor 154. DC power from converter 106 and second energy storage device 138 is converted into an AC signal by voltage inverter 134 to drive electric motor 136. Operation during regenerative braking is similar as described above, where bi-directional DC-to-DC voltage converter 106 bucks the higher voltage from the DC side of the DC-to-AC voltage inverter 134 to the lower voltage to partially charge the first energy storage device 102.

Figure 4:
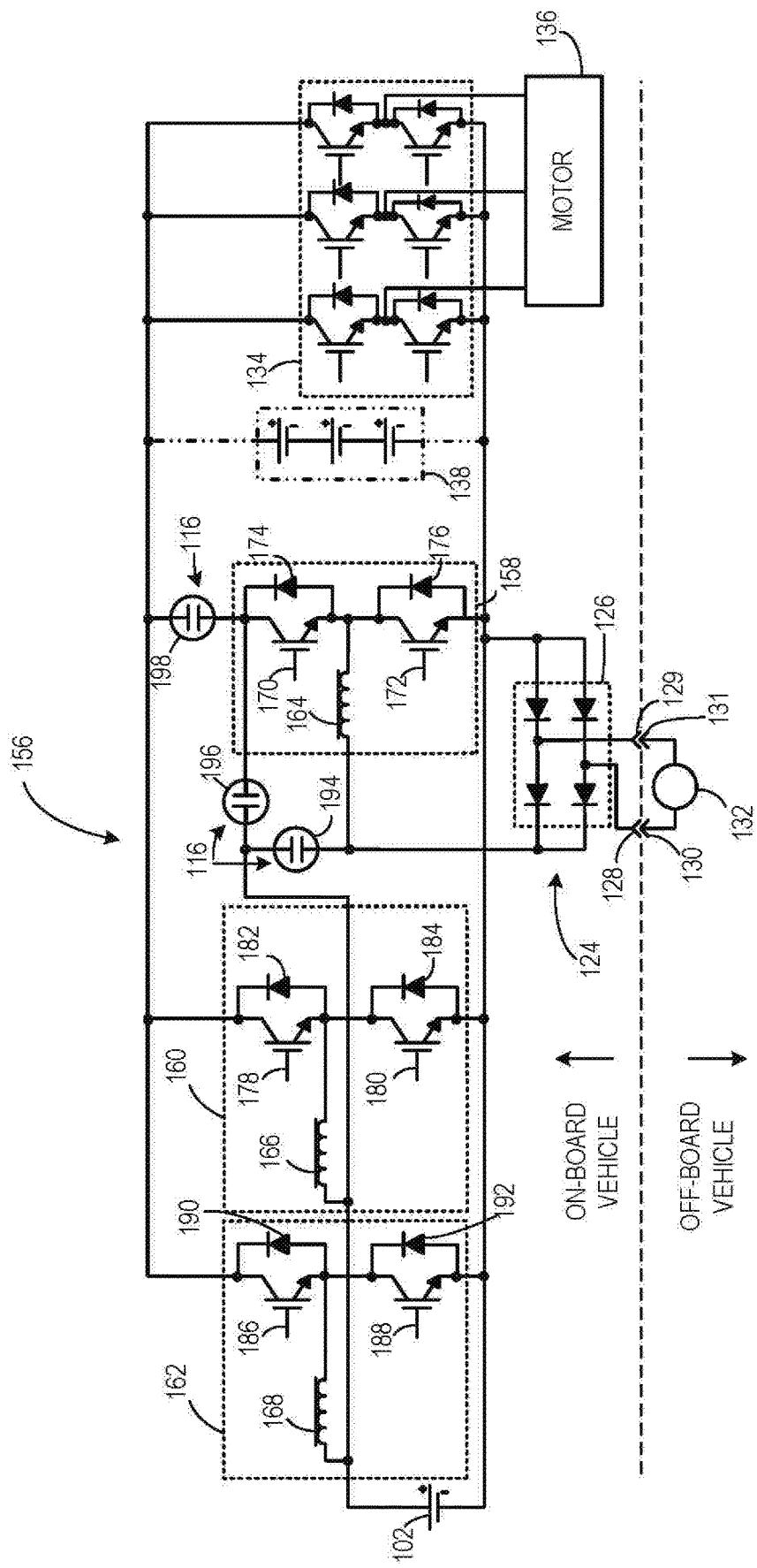
FIG. 4 is a schematic diagram illustrating a traction system according to another embodiment of the invention.

An embodiment of the invention illustrated in FIG. 4 shows a traction system 156 usable in a vehicle, such as a plug-in electric or plug-in hybrid vehicle, or stationary electric drive system. Traction system 156 includes a first, second, and third bi-directional DC-to-DC voltage converter 158, 160, 162 coupled in parallel. Converters 158-162 respectively include a first, second, and third inductor 164, 166, 168 of traction system 156. Converter 158 includes a first and second transistor 170, 172 and a first and second diode 174, 176 of traction system 156. Converter 160 includes a third and fourth transistor 178, 180 and a third and fourth diode 182, 184 of traction system 156. Converter 162 includes a fifth and sixth transistor 186, 188 and a fifth and sixth diode 190, 192 of traction system 156. Each transistor 170, 172, 178, 180, 186, 188 is coupled in anti-parallel with a respective diode 174, 176, 182, 184, 190, 192. Each of the bi-directional DC-to-DC voltage converters 158-162 may be a bi-directional buck/boost converter.

Coupling system 116 includes a first, second, and third contactor 194, 196, and 198, respectively. First energy storage device 102 is directly coupleable to second inductor 166, to third inductor 168, and to first inductor 164 through first contactor 194. Second contactor 196 is coupled between first transistor 170 and first energy storage device 102. Third contactor 198 is coupled between first transistor 170 and three-phase voltage inverter 134, which is coupled to electric motor 136.

In operation, first energy storage device 102 is charged when second contactor 196 is closed and the other two contactors 194, 198 are open. External energy source 132 provides a DC power signal or an AC power signal, for example from the utility grid, which is converted into a DC signal by diode rectifier 126. The DC signal flows through inductor 164, first contactor 196 and bidirectional DC-to-DC voltage converter 158 to first energy storage device 102.

Second energy storage device 138, if present is charged when third contactor 198 is closed and the other two contactors 194, 196 are open. In this case, an AC power signal, as might be provided by the utility grid, is converted to a DC signal by diode rectifier 126. The DC signal flows through bi-directional DC-to-DC voltage converter 158 (first inductor 164, second transistor 172, first diode 174) and through third contactor 198 to second energy storage device 138. When the vehicle is motoring, second contactor 196 is open and the other two contactors 194, 198 are closed. In this mode, first energy storage device 102 supplies a DC signal to each of the inductors 166, 168, 164 of the respective bi-directional DC-to-DC voltage converters 158, 160, 162. Each of the three voltage converters 158, 160, 162 boosts the DC signal from first energy storage device 102 and outputs the boosted voltage to voltage inverter 134, where the resulting DC signal is converted into an AC signal suitable for driving electric motor 136. One or all of the boost converters may be used depending on the power needed. If low power is needed, only one of the converters can be used to increase overall part load efficiency. When more than one converter is used, their switching may be interleaved to increase the effective switching frequency and thereby reduce ripple current and voltage on first energy storage device 102 and any other DC bus filters (not shown). Operation during regenerative braking is similar as described above, where bi-directional DC-to-DC voltage converters 158, 160, 162 are operated in a buck mode to reduce the voltage generated by motor 136 after passing through voltage inverter 134.

Figure 5:
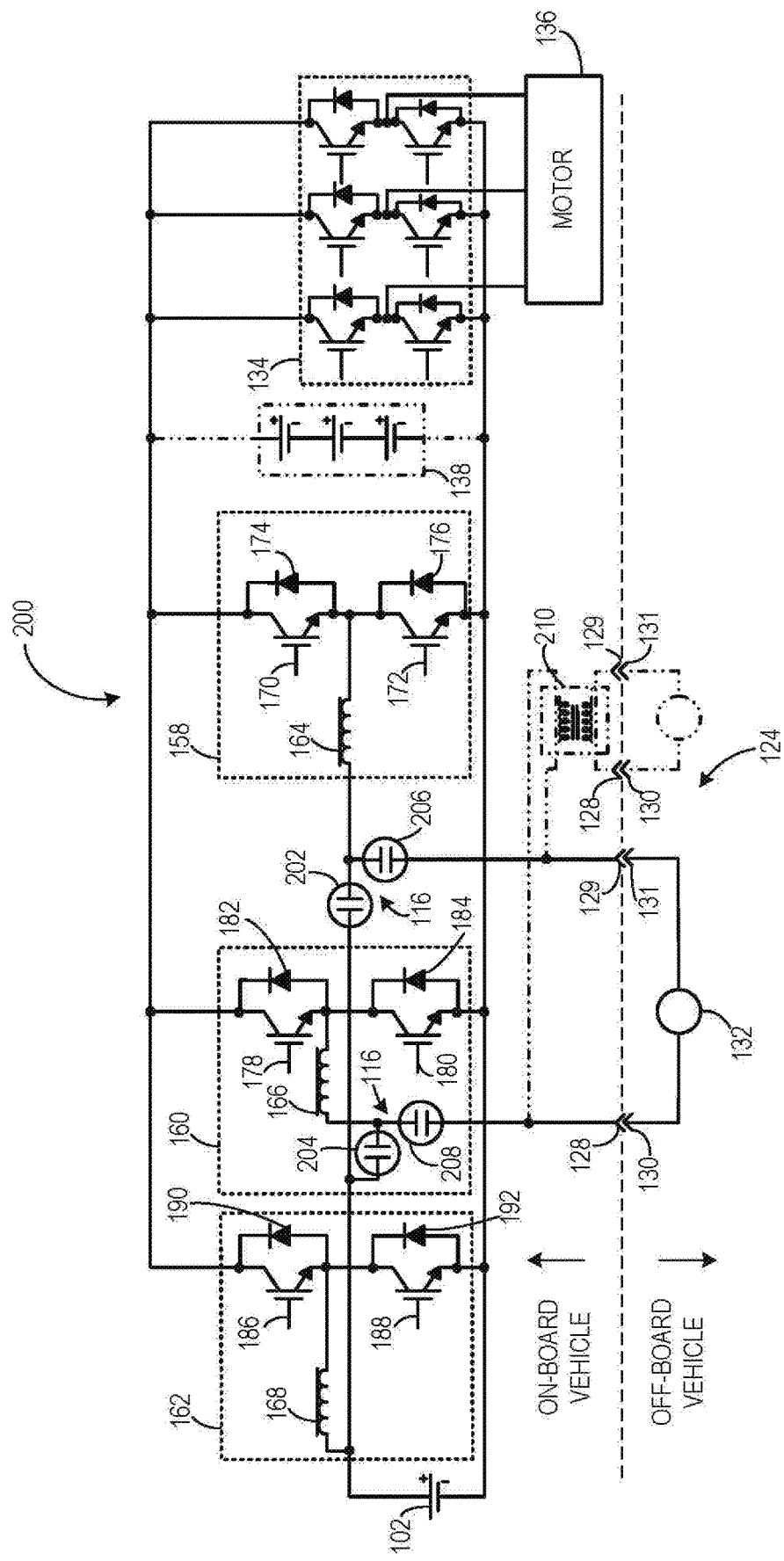
FIG. 5 is a schematic diagram illustrating a traction system according to another embodiment of the invention.

An embodiment of the invention illustrated in FIG. 5 shows an embodiment of a traction system 200 usable in a vehicle, such as a plug-in electric or plug-in hybrid vehicle, or other stationary electric drive system. Coupling system 116 includes a first, second, third, and fourth contactor 202, 204, 206, 208. First energy storage device 102 is directly coupleable to first inductor 164 through first contactor 202 and to second inductor 166 through second contactor 204. First energy storage device 102 is directly coupled to third inductor 168. Outputs of the three bi-directional DC-to-DC voltage converters 158, 160, 162 are coupled to voltage inverter 134, which is, in turn, coupled to electric motor 136. Input device 124 having receptacle 128, 129 for a plug 130, 131 is configured to receive electrical power from external energy source 132, which may be an external AC power source, such as the utility grid. One terminal of input device 124 is directly coupleable to second inductor 166 through fourth contactor 208, and the second terminal of input device 124 is directly coupleable to first inductor 164 through third contactor 206.

In an alternate embodiment of the invention, input device 124 further includes a transformer 210 (shown in phantom) to isolate system 200 from external energy source 132. Typically, electrical outlets provide 120 volts AC or 240 volts AC. Transformer 210 could be configured to step up the utility grid voltage at input device 124 from 120 Vac or 240 Vac to 480 Vac or higher. The higher voltage allows for faster charging of energy storage devices 102, 132.

In operation, both first energy storage device 102 and second energy storage device 138 are charged when the third and fourth contactors 206, 208 are closed and the first and second contactors 202, 204 are open. External energy source 132 provides a voltage to system 200 at input device 124. With no rectifier, the first and second bi-directional voltage converters 158, 160 are used to convert an AC input voltage into a DC voltage via an AC source coupled between to full bridge phase legs, comprised of transistors 178, 180 in one phase leg and 170 and 172 in the second phase leg. Note, the operation of two phase legs in the two bi-directional DC-DC converters 158, 160 is similar to operation of two of the three phase legs of DC-to-AC voltage inverter 134 during regenerative braking mode when electric motor 136 generates an AC voltage and voltage inverter 134 produces a DC voltage.

When the vehicle is motoring, the first and second contactors 202, 204 are closed and the third and fourth contactors 206, 208 are open. In this case, closing the first and second contactors 202, 204 results in coupling first energy storage device 102 to the first, second and third inductors 164, 166, 168 of the respective bi-directional DC-to-DC voltage converters 158, 160, 162. Converters 158, 160, 162 boost the DC voltage from first energy storage device 102 and output the boosted DC voltage to voltage inverter 134 and to second energy storage device 138, if present. Voltage inverter 134 converts the DC voltage into an AC voltage suitable for driving electric motor 136.

Figure 6:
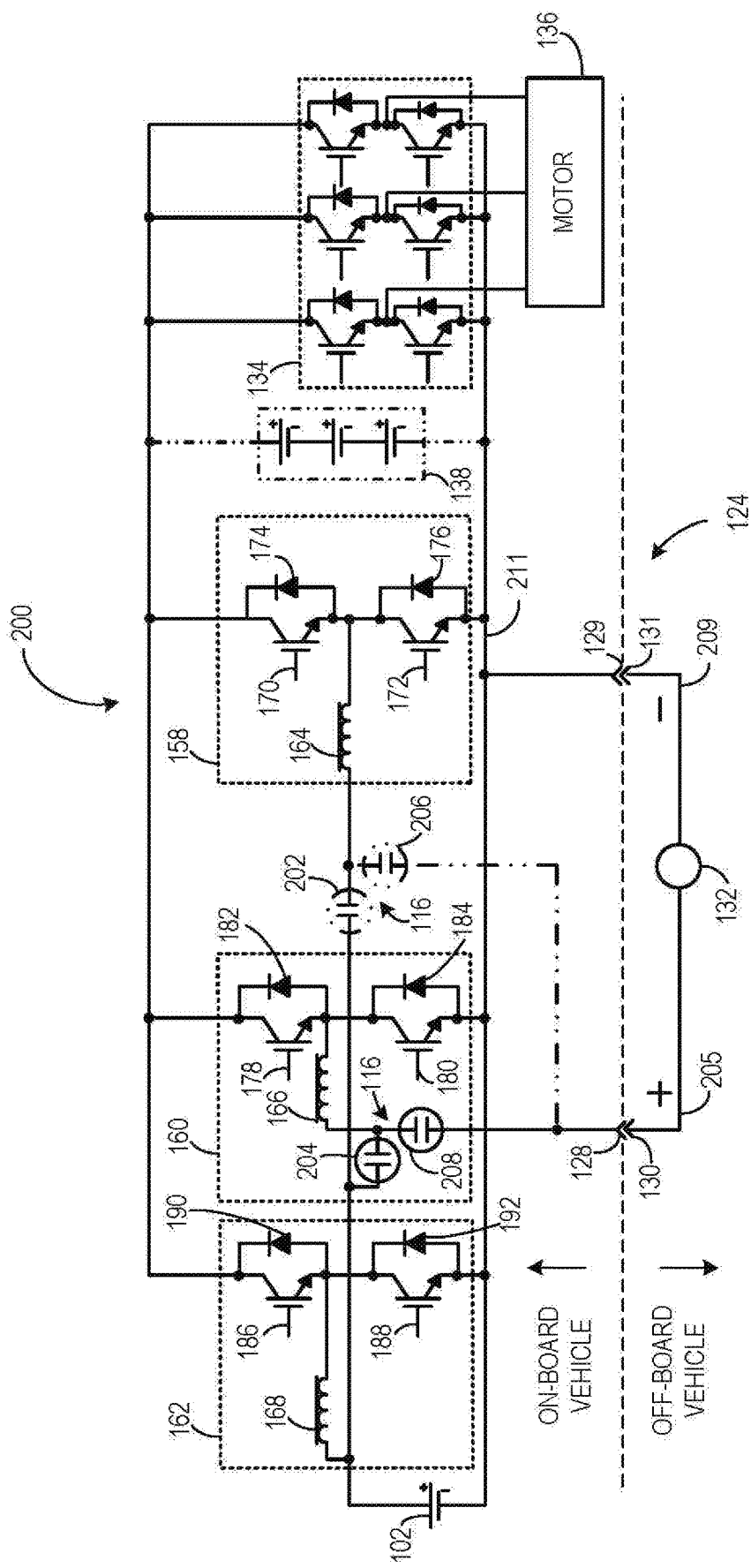
FIG. 6 is an alternate embodiment of the traction system illustrated in FIG. 5 according to another embodiment of the invention.

FIG. 6 shows an alternate embodiment of traction system 200 illustrated in FIG. 5. In this embodiment, external energy source 132 is a DC power source and utilizes either a single bi-directional DC-DC converter, for example either 160 or 158, or for higher power charging applications, utilizes two bi-directional DC-to-DC voltage converters 160, 158 in a parallel mode using asynchronous and staggered switching to advantageously minimize ripple current to further increase charger efficiency. A first positive terminal 205 of DC power source 132 is directly connected, through plug 130, 131 and receptacle 128, 129, to a contactor such as contactor 208 as shown for single DC-to-DC boost converter operation. Positive terminal 205, however, may instead be connected to contactor 206 (as shown in phantom) for single DC-to-DC boost converter operation. For higher power operation, positive terminal 205 may be connected, through plug 130, 131 and receptacle 128, 129, to both contactors 208 and 206. A negative terminal 209 of DC power source 132 is directly connected, through plug 131 and receptacle 129, to a common line 211 of traction system 200.

For charging of first energy storage device 102 and, if present, second energy storage device 138, first positive terminal 205 supplies DC power through contactor 208 to second bi-directional DC-to-DC voltage converter 160. If contactor 206 is also connected to first positive terminal 205, DC power is supplied to first bi-directional DC-to-DC voltage converter 158. DC power flows directly to second energy storage device 138, and through transistor 186 and inductor 168 to first energy storage device 102.

When the vehicle is motoring, contactor 204 and contactor 202, if present, are closed and contactor 208 and contactor 206, if present, are open. In this case, closing contactors 202, 204 results in coupling first energy storage device 102 to the first, second and third inductors 164, 166, 168 of the respective bi-directional DC-to-DC voltage converters 158, 160, 162. Converters 158, 160, 162 boost the DC voltage from first energy storage device 102 and output the boosted DC voltage to voltage inverter 134 and to second energy storage device 138, if present. Voltage inverter 134 converts the DC voltage into an AC voltage suitable for driving electric motor 136.

Figure 7:
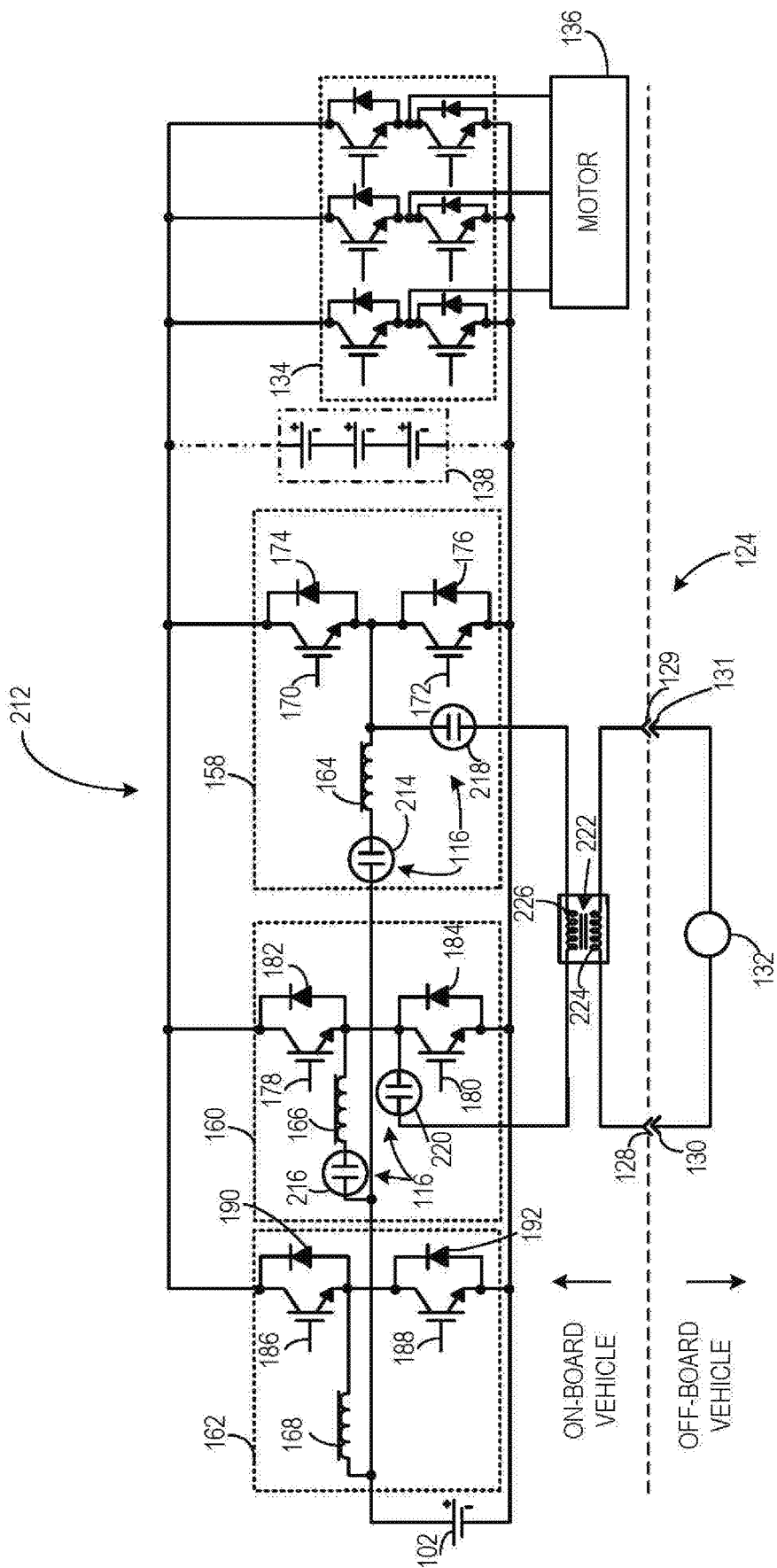
FIG. 7 is a schematic diagram illustrating a traction system according to another embodiment of the invention.

An embodiment of the invention illustrated in FIG. 7 shows a traction system 212 usable in a vehicle, such as a plug-in electric or plug-in hybrid vehicle, or stationary electric drive system. Coupling system 116 includes a first, second, third, and fourth contactor 214, 216, 218, 220. First energy storage device 102 is directly coupleable to first inductor 164 through first contactor 214 and to second inductor 166 through second contactor 216. First energy storage device 102 is directly coupled to third inductor 168. Outputs of the three bi-directional DC-to-DC voltage converters 158, 160, 162 are coupled to voltage inverter 134 which is, in turn, coupled to electric motor 136. Input device 124 has an isolation transformer 222, rather than diode rectifier 126, coupled to receptacle 128, 129. Isolation transformer 222 includes a first inductor winding 224 and a second inductor winding 226. Second inductor winding 226 is directly coupleable, through third contactor 218, to a node 228 between first and second transistors 170, 172 of first bi-directional DC-to-DC voltage converter 158. Second inductor winding 226 is also directly coupleable, through a fourth contactor 220, to a node 230 between third and fourth transistors 178, 180 of second bi-directional DC-to-DC voltage converter 160. In this embodiment, transformer winding inductance is used instead of bidirectional DC-DC converter inductors 164, 166 as shown in FIG. 5, during charging operation of first energy storage device 102 and second energy storage device 138, if present, with connection to external AC power source 132.

In operation, both first energy storage device 102 and second energy storage device 138, if present, are charged when the third and fourth contactors 218, 220 are closed and the first and second contactors 214, 216 are open. Depending on the configuration of isolation transformer 222 and inductor windings 224, 226, the voltage from external energy source 132 through input device 124 may be 120 Vac, 240 Vac, 480 Vac, or some higher voltage. Operation of the two full phase legs from bi-directional DC-to-DC voltage converters 160, 158 convert the AC voltage applied to the mid-point of the full phase transistor bridge circuits using the transformer winding inductance is similar to operation of DC-to-AC voltage inverter 134 during regenerative braking operation when the AC voltage from motor 136 is converted to a DC voltage at inverter 134. That same DC voltage is also supplied to fifth transistor 186 and third inductor 168 of third bi-directional DC-to-DC voltage converter 162 to charge first energy storage device 102 using the bi-directional DC-to-DC voltage converter 162 in a buck mode of operation.

When the vehicle or stationary electric drive system is motoring, the first and second contactors 214, 216 are closed and the third and fourth contactors 218, 220 are open. First energy storage device 102 supplies a DC voltage to first inductor 164 through first contactor 220, and to second inductor 166 through second contactor 216, and to third inductor 168 directly. The three bi-directional DC-to-DC voltage converters 158, 160, 162 boost the DC voltage and supply the boosted voltage to voltage inverter 134 which converts the DC voltage into an AC voltage suitable for driving electric motor 136.

Figure 8:
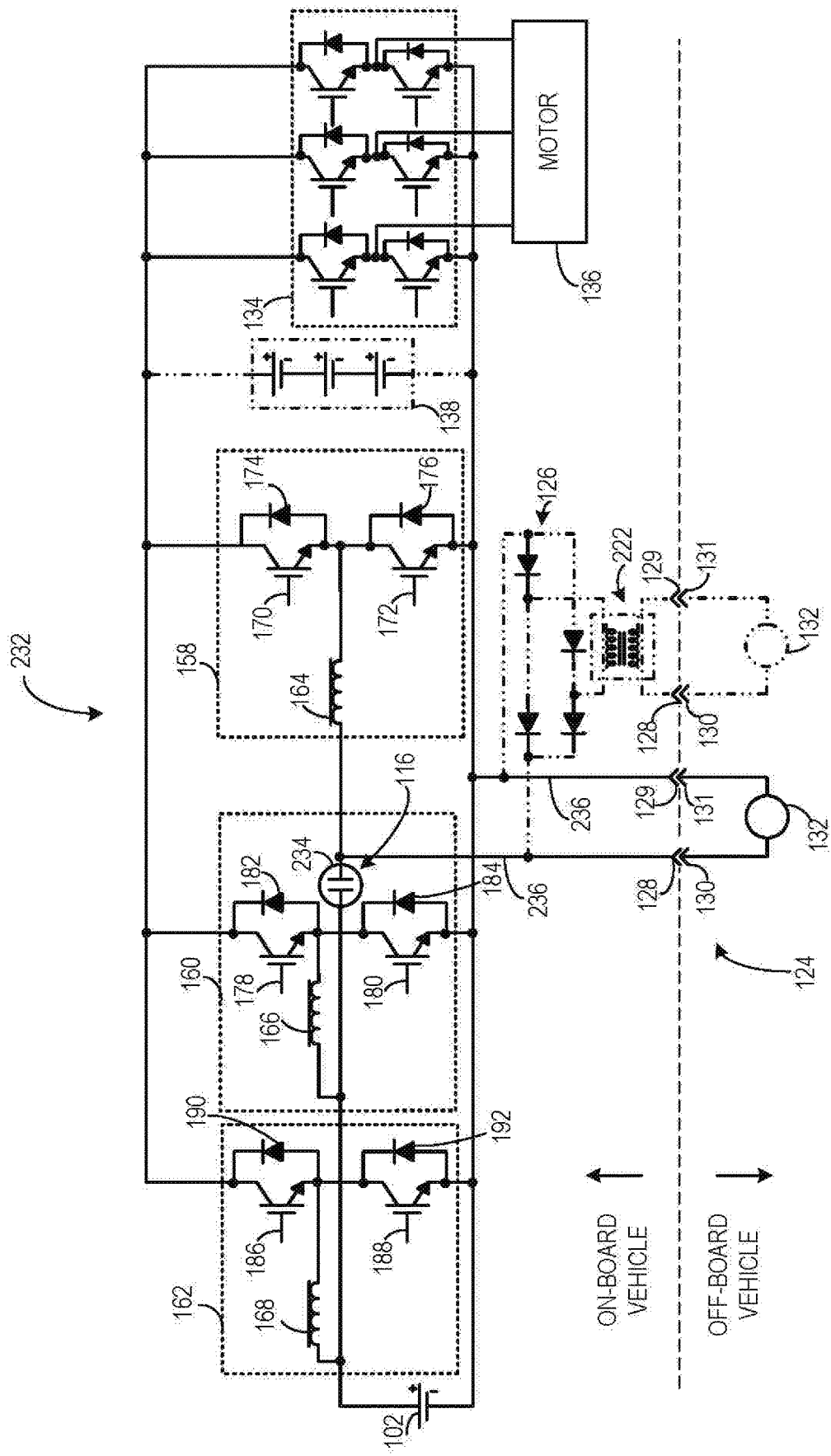
FIG. 8 is a schematic diagram illustrating a traction system according to another embodiment of the invention.

An embodiment of the invention illustrated in FIG. 8 shows a traction system 232 usable in a vehicle, such as a plug-in electric or plug-in hybrid vehicle, or stationary electric drive system. Coupling system 116 includes a contactor 234. First energy storage device 102 is directly coupleable to first inductor 164 through contactor 234 and is directly coupled to second and third inductors 166, 168. Input device 124 includes a power bus 236 coupling receptacle 128, 129 to first bi-directional DC-to-DC voltage converter 158. In an embodiment of the invention, input device 124 includes diode rectifier 126 and optional transformer 222 (shown in phantom) which is coupled to receptacle 128, 129.

In operation, first energy storage device 102 is charged by opening contactor 234 to remove a direct parallel connection between first energy storage device 102 and input device 124. Second energy storage device 138 is charged by bidirectional DC-to-DC voltage converter 158 operating in boost mode. Storage device 102 can be charged simultaneously by either or both of bidirectional DC-to-DC voltage converters 160 and 162 operating in buck mode. In one embodiment, external power source 132 provides an AC voltage to input device 124, where the signal is converted into a DC voltage by diode rectifier 126. In an alternate embodiment of the invention, external energy source 132 is a DC power source and supplies a DC voltage to input device 124. The DC signal from diode rectifier 126 flows through first inductor 164, first transistor 170 and first diode 174 to second energy storage device 138. First energy storage device 102 can be charged through either, second inductor 166 and third transistor 178, or through third inductor 168 and fifth transistors 186.

When the vehicle is motoring, or the stationary electric drive is not connected to the external source 132, contactor 234 is closed, and receptacle 128, 129 is disengaged from plug 130, 131. First energy storage 102 device supplies a DC voltage to the first, second and third inductors 164, 166, 168 of the first, second and third bi-directional DC-to-DC voltage converters 158, 160, 162 to boost the DC voltage. The boosted DC voltage is output to voltage inverter 134, which converts the DC voltage into an AC voltage suitable for driving electric motor 136.

An alternate embodiment of system 232 includes isolation transformer 222 (shown in phantom) coupled to diode rectifier 126 of input device 124. Depending on its configuration, transformer 222 can step up the voltage supplied by external energy source 132. Increasing the input voltage into system 232 may reduce the time needed to charge energy storage devices 102, 138.

Figure 9:
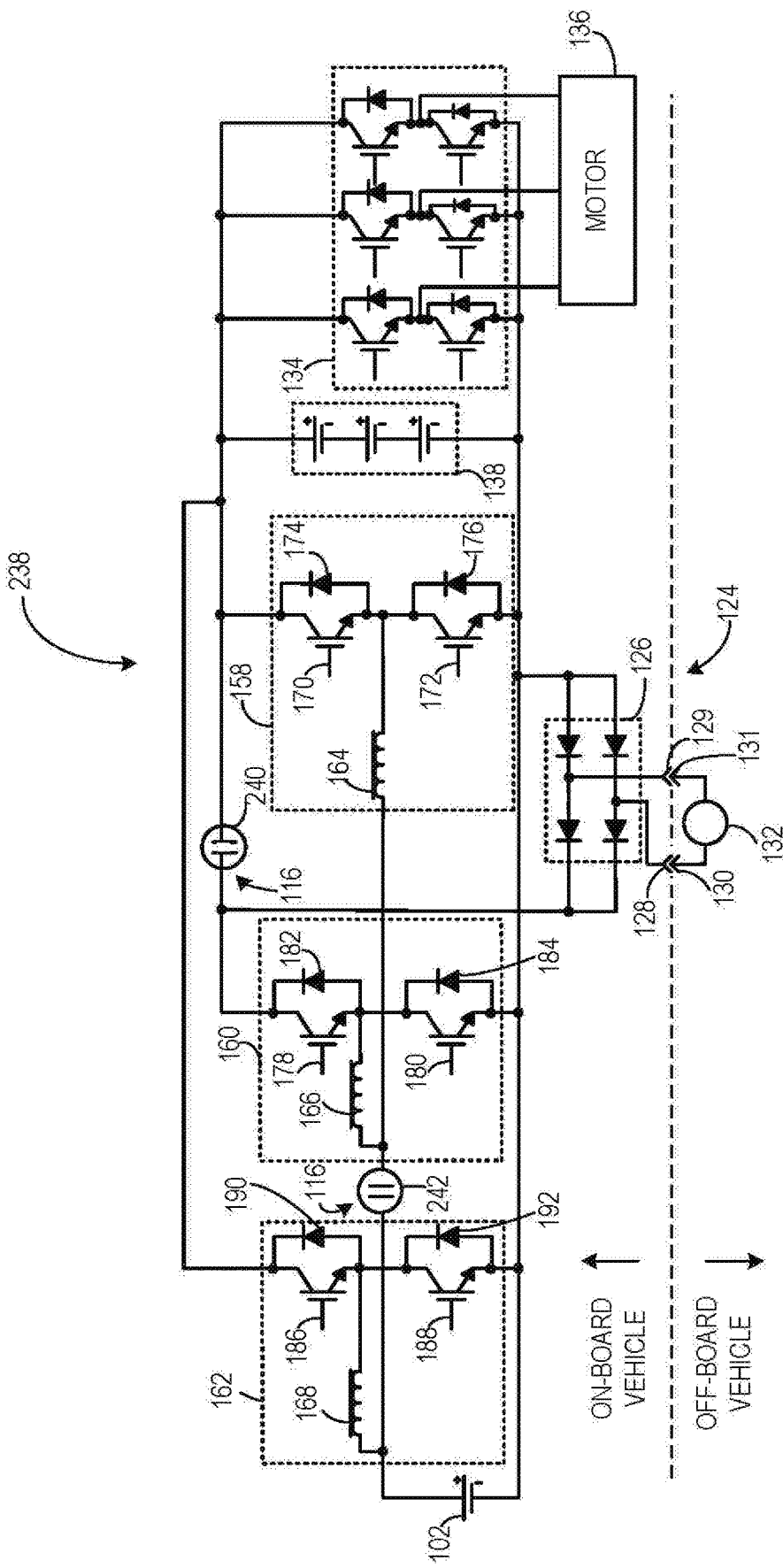
FIG. 9 is a schematic diagram illustrating a traction system according to an embodiment of the invention.

An embodiment of the invention illustrated in FIG. 9 shows a traction system 238 usable in a vehicle, such as a plug-in electric or plug-in hybrid vehicle, or a stationary electric drive system. First and fifth transistors 170, 186 are directly coupled to second energy storage device 138. Coupling system 116 includes a first and second contactor 240, 242. Third transistor 178 is directly coupleable to second energy storage device 138 through first contactor 240. First storage device 102 is directly coupleable to first and second inductors 164, 166 through second contactor 242 and is coupled to third inductor 168 directly. Input device 124 includes diode rectifier 126 and receptacle 128, 129 for electric plug 130, 131 and is configured to receive electrical energy from external energy source 132.

In operation, second energy storage device 138, if present, is charged by opening first and second contactors 240, 242. If second energy storage device 138 is not present, a large DC link filter capacitor (not shown) associated with the DC-to-AC voltage inverter 134 that performs a DC link filtering or smoothing function allows the DC input voltage at inverter 134 to be filtered, and the value of the voltage is regulated in part by the power used to charge first energy storage device 102 through bi-directional DC-to-DC voltage converter 162. External energy source 132 supplies an input voltage to system 238 through input device 124. If necessary (i.e., if external energy source 132 is an AC energy source), diode rectifier 126 converts an AC input voltage into a DC signal. In buck mode (i.e., instantaneous input voltage is higher than the voltage of second energy storage device 138), electrical energy from input device 124 is supplied through third switching transistor 178, first and second inductors 164, 166 first and fourth diodes 174, 184 (the freewheel diode), to second energy storage device 138. In boost mode (i.e., instantaneous input voltage is below the voltage of energy storage device 138), transistor 178 continuously conducts and second transistor 172 is switched to regulate the output of first bi-directional DC-to-DC voltage converter, 158. Electrical energy from input device 124 is supplied through third transistor 178, first and second inductors 164, 166, first diode 174, to second energy storage device 138. Generally, the output voltage from first and second bi-directional DC-to-DC voltage converters 158, 160 is controlled and set at a level that maximizes an energy transfer power factor between external energy source 132 and second energy storage device 138. Energy is transferred from second energy storage device 138 to charge first energy storage device 102 through third bi-directional DC-to-DC voltage converter 162. Electrical energy flows through switching fifth transistor 186, freewheeling sixth diode 192 and third inductor 168 to charge first energy storage device 102. It is noted that this arrangement allows for both bucking and boosting of the input source and therefore allows near sinusoidal current to be drawn from the input AC line (thus achieving high power factor) independent of the AC input voltage level. In addition, any practical DC source voltage can be accommodated since the converters 158, 160 can either buck or boost resulting in an extremely flexible charging system.

During motoring, first and second contactors 240, 242 are closed. First energy storage device 102 supplies a DC voltage to first and second bi-directional DC-to-DC voltage converters 158, 160 through second contactor 242, and to third bi-directional DC-to-DC voltage converter 162 directly. Each of the bi-directional DC-to-DC voltage converters 158, 160, 162 boosts the DC voltage from first energy storage device 102 and outputs the boosted voltage to voltage inverter 134, which converts the DC voltage into an AC voltage suitable for driving electric motor 136. One or all of the boost converters may be used depending on the power needed. If low power is needed, only one of the converters can be used to increase overall part load efficiency. When more than one converter is used, their switching may be interleaved to increase the effective switching frequency and thereby reduce ripple current and voltage on first energy storage device 102 and any other DC bus filters (not shown).

According to one embodiment of the invention, a motor drive circuit includes a first energy storage device configured to supply electrical energy, a bi-directional DC-to-DC voltage converter coupled to the first energy storage device, a voltage inverter coupled to the bi-directional DC-to-DC voltage converter, and an input device configured to receive electrical energy from an external energy source. The motor drive circuit further includes a coupling system coupled to the input device, to the first energy storage device, and to the bi-directional DC-to-DC voltage converter. The coupling system has a first configuration configured to transfer electrical energy to the first energy storage device via the bi-directional DC-to-DC voltage converter, and has a second configuration configured to transfer electrical energy from the first energy storage device to the voltage inverter via the bi-directional DC-to-DC voltage converter.

In accordance with another embodiment of the invention, a method of manufacturing that includes providing a first energy storage device, coupling a first bi-directional buck/boost converter to the first energy storage device, and coupling an input device to the first bi-directional buck/boost converter. The input device is configured to receive electrical energy from an external energy source. The method further includes coupling one or more coupling devices to the first bi-directional buck/boost converter, to the first energy storage device, and to the input device, the one or more coupling devices configured to cause electrical energy to charge the first energy storage device via the first bi-directional buck/boost converter, and configured to cause electrical energy from the first energy storage device to transfer to the voltage inverter via the first bi-directional buck/boost converter.

In accordance with yet another embodiment of the invention, a traction system includes an electric motor configured to propel a vehicle and a voltage inverter configured to supply an AC power signal to the electric motor. The system also includes a motor drive circuit configured to supply a DC power signal to the voltage inverter. The motor drive circuit has a first battery and a first bi-directional buck/boost converter coupled to the first battery, the first bi-directional buck/boost converter having a first inductor and a first transistor. The motor drive circuit also has an input device configured to receive electrical energy from an external energy source and has a coupling system having a first configuration in which the external energy source is coupled to the first battery via the input device and the first bi-directional buck/boost converter. The coupling system also has a second configuration in which the first battery is coupled to the voltage inverter via the first bi-directional buck/boost converter.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A charging system for a vehicle comprising:
   a first energy storage device;
   an electromechanical device coupleable to the first energy storage device;
   a second energy storage device;
   an input device configured to be coupled to an external charging source to provide an input voltage having one of a relatively low magnitude and a relatively high magnitude associated with slower and faster charging rates, respectively;
   a plurality of voltage converters coupled to the input device, wherein:
      a first voltage converter of the plurality of voltage converters has an input coupled to the input device and an output coupled to the second energy storage device and is configured to boost the input voltage to an intermediate voltage for charging the second energy storage device; and
      a second voltage converter of the plurality of voltage converters has an input coupled to the first voltage converter and an output coupled to the first energy storage device and is configured to buck the intermediate voltage to an output voltage to charge the first energy storage device; and
   a switching device coupled between the first energy storage device and the electromechanical device, the switching device configured to be conducting when the vehicle is in a driving mode, the switching device configured to be non-conducting when the first energy storage device and second energy storage device are being charged.

2. The vehicle charging system of claim 1, wherein the first voltage converter comprises a boost converter.

3. The vehicle charging system of claim 1, further comprising an inverter coupled between the electromechanical device and the first energy storage device.

4. The vehicle charging system of claim 1 further comprising a buck/boost converter coupled between the electromechanical device and the first energy storage device.

5. The vehicle charging system of claim 1, wherein the input device comprises a receptacle.

6. The vehicle charging system of claim 1, wherein the input device comprises a rectifier.

7. A vehicle comprising:
   a first battery;
   a traction motor coupleable to the first battery;
   a second battery;

an input device configured to be coupled to an external charging source to provide an input voltage having one of a relatively low magnitude and a relatively high magnitude associated with slower and faster charging rates, respectively; and a plurality of DC converters coupled to the input device, the plurality of DC converters comprising a first DC converter having an input coupled to the input device and an output coupled to the second battery and a second DC converter having an input coupled to the first DC converter and an output coupled to the first battery, the plurality of DC converters configured to:

boost the input voltage to an intermediate voltage via a first DC converter for charging the second battery; and buck the intermediate voltage to an output voltage via a second DC converter to charge the first battery;

a contactor coupled between the first battery and the traction motor, the contactor configured to be closed when the vehicle is in a driving mode, the contactor configured to be open when the first battery and the second battery are being charged.

8. The vehicle of claim 7, wherein the first DC converter comprises a boost converter.

9. The vehicle of claim 7, further comprising an inverter coupled between the traction motor and the first battery.

10. The vehicle of claim 7, further comprising a buck/boost converter coupled between the traction motor and the first battery.

11. The vehicle of claim 7, wherein the input device comprises a receptacle.

12. The vehicle of claim 7, wherein the input device comprises a rectifier.

13. A method for charging a vehicle, the vehicle including a first energy storage device and a second energy storage device coupled to an input device and a plurality of voltage converters, and a switching device coupled between first energy storage device and an electromechanical device, the method comprising:

providing an input voltage via an input device, the input voltage having one of a relatively low magnitude and a relatively high magnitude associated with slower and faster charging rates, respectively;

boosting the input voltage to an intermediate voltage via a first voltage converter of the plurality of voltage converters for charging the second energy storage device, the first voltage converter having an input coupled to the input device and an output coupled to the second energy storage device;

bucking the intermediate voltage to an output voltage via a second voltage converter of the plurality of voltage converters for charging the first energy storage device, the second voltage converter having an input coupled to the first voltage converter and an output coupled to the first energy storage device;

operating the switching device to be conducting when the vehicle is in a driving mode; and operating the switching device to be non-conducting when the first energy storage device and the second energy storage device are being charged.

14. The method of claim 13, further comprising rectifying the input voltage via a rectifier.

* * * * *